US011281434B2

(12) United States Patent
Sandberg et al.

(10) Patent No.: US 11,281,434 B2
(45) Date of Patent: Mar. 22, 2022

(54) APPARATUS AND METHOD FOR MAINTAINING A COUNTER VALUE

(71) Applicant: Arm Limited, Cambridge (GB)

(72) Inventors: Andreas Lars Sandberg, Cambridge (GB); Matthias Lothar Boettcher, Cambridge (GB)

(73) Assignee: Arm Limited, Cambridge (GB)

( * ) Notice: Subject to any disclaimer, the term of this patent is extended or adjusted under 35 U.S.C. 154(b) by 91 days.

(21) Appl. No.: 16/745,808

(22) Filed: Jan. 17, 2020

(65) Prior Publication Data

US 2021/0224042 A1 Jul. 22, 2021

(51) Int. Cl.
*G06F 7/72* (2006.01)
(52) U.S. Cl.
CPC ................... *G06F 7/724* (2013.01)
(58) Field of Classification Search
CPC .... G06F 7/485; G06F 7/498; G06F 7/50–506; G06F 7/724; G06F 2201/88;
(Continued)

(56) References Cited

U.S. PATENT DOCUMENTS

2014/0219320 A1* 8/2014 Germain .............. G01S 19/30
375/147
2019/0229924 A1* 7/2019 Chhabra ............... H04L 9/3242
(Continued)

FOREIGN PATENT DOCUMENTS

EP 0333029 A2 * 9/1989 ........... H04N 7/0882

OTHER PUBLICATIONS

G. Saileshwar et al., SYNERGY:Rethinking Secure-Memory Design for Error-Correcting Memories, 2018 IEEE International Symposium on High Performance Computer Architecture, IEEE Computer Society, 2018 (Year: 2018).*

*Primary Examiner* — Emily E Larocque
(74) *Attorney, Agent, or Firm* — Nixon & Vanderhye P.C.

(57) ABSTRACT

An apparatus and method are provided for maintaining a counter value. The apparatus has first counter control circuitry for maintaining a first counter value representing a first portion of a hybrid counter value, and second counter control circuitry for maintaining a second counter value representing a second portion of the hybrid counter value, wherein the second portion is a higher order portion of the hybrid counter value than the first portion. The first counter control circuitry is arranged to maintain the first counter value as a binary value that indicates a magnitude of the first counter value, the first counter control circuitry comprising adder circuitry that is responsive to an adjustment value to update the first counter value by performing an addition operation to add the adjustment value to a current binary value of the first counter value, and to generate a carry out signal which is set when a carry out is generated by the addition operation. The second counter control circuitry is arranged to maintain the second counter value as a bit sequence having N discrete states, and is responsive to the carry out signal being set to transition the second counter value from the current discrete state to a new discrete state. This allows an arbitrary value to be used as the adjustment value, that is smaller than or equal to the maximum value of the first counter, whilst avoiding the need for the generation and handling of carry bits to be managed across the entire bit range of the hybrid counter value.

11 Claims, 8 Drawing Sheets

(58) Field of Classification Search
CPC .... G06F 2207/481; G06F 21/64; G06F 21/78; G06F 3/062–0623
See application file for complete search history.

(56) References Cited

U.S. PATENT DOCUMENTS

2019/0251275 A1    8/2019   Ramrakhyani et al.
2019/0394021 A1*  12/2019   Awad ................... G06F 3/0656

* cited by examiner

APPARATUS AND METHOD FOR MAINTAINING A COUNTER VALUE

BACKGROUND

The present technique relates to an apparatus and method for maintaining a counter value.

A traditional counter circuit may maintain a binary count value that expresses a magnitude of the counter, and may include adder circuitry to allow an arbitrary value to be added to the current counter value. However, such circuitry requires logic to determine and manage the carry bits generated during the addition process. For instance, a ripple-carry adder (RCA) could be used where the carry bit is calculated alongside each sum bit, and each stage must wait until the previous carry bit has been calculated to begin calculating its own sum bit and carry bit. However, speed can be improved by using a carry-lookahead adder (CLA) which is able to calculate one or more carry bits before the sum, hence reducing the wait time to calculate the result of the addition operation.

However, it is not always the case that a count value is required that expresses an absolute magnitude, and instead it may be enough that the count value can be caused to change upon occurrence of certain events. For example, a Galois counter may be used to implement a cheap counter in hardware. Such counters are very efficient in hardware, since they do not require circuitry to determine and handle carry bits, such as the earlier mentioned carry-lookahead circuitry. However, such counters can only be incremented one step at a time, and hence cannot be incremented by arbitrary values. This hence limits the situations where such counters can be used. It would be desirable to increase the situations in which such cheap counters can be utilised.

SUMMARY

In one example arrangement, there is provided an apparatus comprising: first counter control circuitry to maintain a first counter value representing a first portion of a hybrid counter value; second counter control circuitry to maintain a second counter value representing a second portion of the hybrid counter value, wherein the second portion is a higher order portion of the hybrid counter value than the first portion; wherein: the first counter control circuitry is arranged to maintain the first counter value as a binary value that indicates a magnitude of the first counter value, the first counter control circuitry comprising adder circuitry that is responsive to an adjustment value to update the first counter value by performing an addition operation to add the adjustment value to a current binary value of the first counter value and to generate a carry out signal which is set when a carry out is generated by the addition operation; and the second counter control circuitry is arranged to maintain the second counter value as a bit sequence having N discrete states, and is responsive to the carry out signal being set to transition the second counter value from a current discrete state to a new discrete state.

In another example arrangement, there is provided a method of maintaining a hybrid counter value, comprising: storing a first counter value representing a first portion of the hybrid counter value; storing a second counter value representing a second portion of the hybrid counter value, wherein the second portion is a higher order portion of the hybrid counter value than the first portion; maintaining the first counter value as a binary value that indicates a magnitude of the first counter value; in response to an adjustment value, employing adder circuitry to update the first counter value by performing an addition operation to add the adjustment value to a current binary value of the first counter value and to generate a carry out signal which is set when a carry out is generated by the addition operation; maintaining the second counter value as a bit sequence having N discrete states; and in response to the carry out signal being set, transitioning the second counter value from a current discrete state to a new discrete state.

In a still further example arrangement, there is provided an apparatus comprising: first counter control means for maintaining a first counter value representing a first portion of a hybrid counter value; second counter control means for maintaining a second counter value representing a second portion of the hybrid counter value, wherein the second portion is a higher order portion of the hybrid counter value than the first portion; wherein: the first counter control means is arranged for maintaining the first counter value as a binary value that indicates a magnitude of the first counter value, the first counter control means comprising adder means responsive to an adjustment value for updating the first counter value by performing an addition operation to add the adjustment value to a current binary value of the first counter value and for generating a carry out signal which is set when a carry out is generated by the addition operation; and the second counter control means is arranged for maintaining the second counter value as a bit sequence having N discrete states and, responsive to the carry out signal being set, for transitioning the second counter value from a current discrete state to a new discrete state.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
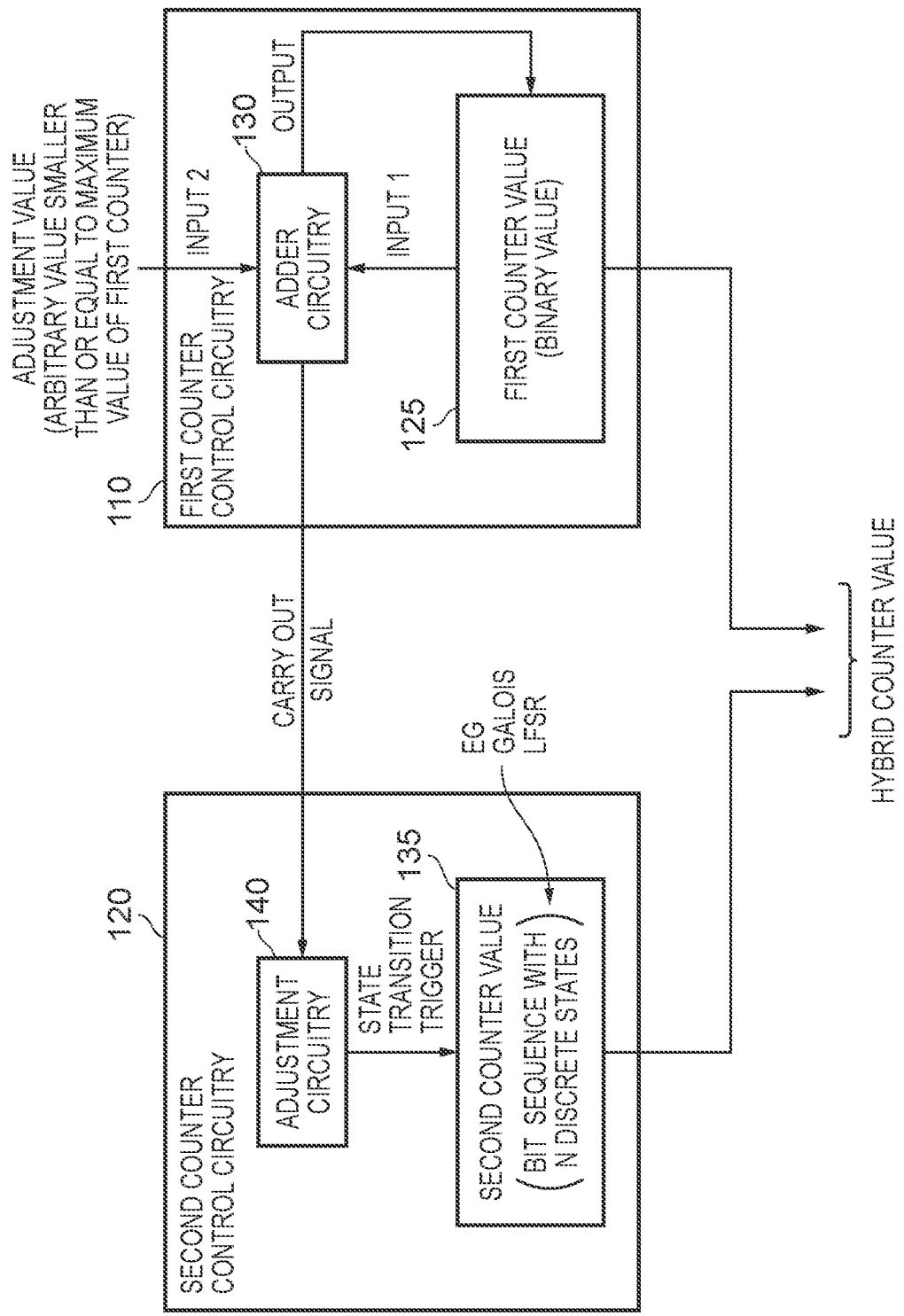
FIG. 1 is a block diagram illustrating circuitry used to provide a hybrid counter value in accordance with one example implementation.

In accordance with the techniques described herein, circuitry used to implement a hybrid counter is provided, that can significantly reduce hardware overhead when compared with an equivalent binary counter, whilst still allowing the counter to be incremented by a range of arbitrary values.

In particular, the apparatus comprises first counter control circuitry for maintaining a first counter value representing a first portion of a hybrid counter value, and second counter control circuitry for maintaining a second counter value representing a second portion of the hybrid counter value, wherein the second portion is a higher order portion of the hybrid counter value than the first portion. In one example implementation, the hybrid counter value comprises only the first portion and the second portion, but in other example implementations the hybrid counter value may also include additional portions. For example, the hybrid counter value may include another portion providing a number of bits of less significance than the bits provided by the first portion.

The first counter control circuitry is arranged to maintain the first counter value as a binary value that indicates a magnitude of the first counter value. The first counter control circuitry comprises adder circuitry that is responsive to an adjustment value to update the first counter value by performing an addition operation to add the adjustment value to a current binary value of the first counter value, and to generate a carry out signal which is set when a carry out is generated by the addition operation. In contrast, the second counter control circuitry is arranged to maintain the second counter value as a bit sequence having N discrete states, and is responsive to the carry out signal being set to transition the second counter value from a current discrete state to a new discrete state. Hence, an absolute magnitude is maintained for the first counter value, and the adder circuitry will have circuitry sufficient to determine and manage the carry bits generated during the addition operation, but the second counter control circuitry does not require such complexity, and merely maintains a bit sequence that can be triggered to change in response to the carry out signal being set.

As a result, the apparatus can provide a counter that can be incremented by an arbitrary value smaller than, or equal to, the maximum binary value of the first counter value, thereby allowing this hybrid counter mechanism to be used in a variety of implementations where it would not be possible to merely use a counter mechanism that could not provide an indication of magnitude. However, in addition, the use of the hybrid counter mechanism described above enables a desired range of discrete counter values to be achieved using significantly less hardware than would be the case had the entire counter been implemented using counter circuitry that sought to maintain a magnitude of the counter value across all bits of the counter value, and hence required the determination and management of carry bits in respect of all bit positions of the counter value.

The second counter control circuitry can take a variety of forms, but in one example implementation is arranged to operate as a Galois counter to maintain the second counter value.

The second counter control circuitry can be organised in a variety of ways but in one example implementation employs a linear feedback shift register to maintain the second counter value. In one example implementation, the linear feedback shift register (LFSR) is arranged in a Galois configuration so as to implement a Galois counter. In accordance with such a configuration, certain bit positions of the LFSR are considered to be taps. When the LFSR is triggered to increment its state, bits that are not taps are shifted one position to the right unchanged. The taps on the other hand are XORed with an output bit (the right-most bit) from the LFSR before they are stored in the next bit position. The new output bit is used as the next input bit to the LFSR. The effect of this is that when the output bit is 0, all the bits in the register shift to the right unchanged, and the input bit becomes 0. Conversely, when the output bit is 1, the bits in the tap positions all flip (if they are 0, they become 1, and if they are 1, they become 0), and then the entire register is shifted to the right and the input bit becomes 1. By appropriate selection of the initial values of the tap bits, it can be ensured that the Galois LFSR cycles through all possible values of the bit sequence represented within the LFSR (other than the all zero state) before returning to the initial state.

In an alternative example the hardware implementation of the Galois LFSR may use XNOR gates instead of XOR gates, which makes the all zero state a valid state. The XOR version is required on a reset to be placed in a state that is not all zero, and hence an implementation that allows the all zero state is beneficial since it makes the reset circuitry easier to implement.

The hybrid counter value generated using the above described apparatus may be used in a wide variety of implementations. However, in one example implementation the hybrid counter value forms a major counter value, and the apparatus further comprises minor counter control circuitry to maintain a plurality of minor counter values, wherein each minor counter value is a binary value that indicates a magnitude of that minor counter value, and each minor counter value is used in combination with the major counter value to form a corresponding combined counter value. Combined counter generation circuitry is then used to generate a combined counter value by combining the major counter value and a selected one of the minor counter values. Hence, the size of the first counter value maintained by the first counter control circuitry can be chosen taking into account the size of the minor counter values, and in particular the range of values that may need to be added to the hybrid counter value when generating the combined counter value.

Typically, it would have been considered necessary to implement the major counter value using counter control circuitry that maintained the entire major counter value as a binary value that indicated a magnitude of that major counter value, but in accordance with the techniques described herein that is not necessary, and accordingly the major counter value can be implemented with significantly reduced hardware cost. In particular, the hybrid counter value is of a form that allows the arbitrary values of the various minor counter values to be added to it, hence maintaining the absolute magnitude requirement for the combined counter, but a certain number of more significant bits of the major counter can be expressed using the second counter value, implemented using a bit sequence having N discrete states. In particular, an absolute magnitude is not required in respect of those more significant bits of the major counter value, and instead the carry out signal from the first counter value, when set, can be used to transition the second counter value from a current state to a next state. This ensures that a unique combined counter value is generated in situations where the addition of the selected minor counter value to the major counter value results in a carry out from the first counter value.

In order to maximise the overall range of the combined counter value, the bit positions of the major counter value and the minor counter value could be non-overlapping. However, this would prevent steps being taken to ensure that a minor counter value did not overflow. Hence, in one example arrangement at least one or more most significant bits of each minor counter value are arranged to form an overlap portion that overlaps with a corresponding number of least significant bits of the first counter value. The apparatus then further comprises normalisation circuitry responsive to a potential overflow condition being detected for a given minor counter value, to determine the adjustment value, to cause the adjustment value to be added to the first counter value, and to cause the overlap portion of each minor counter value (which in the event of full overlap will be the entire minor counter value) to be decremented by the adjustment value, such that the potential overflow condition is addressed without changing the combined counter value generated from any minor counter value. Hence, adjustments can be made to each of the minor counter values, and to the major counter value, such that overflow in one of the minor counters is avoided without changing the combined counter value that would be generated from combining the major counter values with any of the minor counter values.

The point at which the potential overflow condition is detected can vary depending on implementation. In one example arrangement, the potential overflow condition is detected when addition of a specified value to the given minor counter value would cause the given minor counter value to overflow, and the adjustment value is chosen such that the specified value can be added to the given minor counter value as decremented by the adjustment value without the overflow condition arising. The specified value can hence be set as appropriate to seek to ensure that the normalisation is performed before a situation arises where any of the minor counter values does in fact overflow.

In one example arrangement, all bits of each minor counter value overlap with corresponding bits of the first counter value. This maximises the adjustment that can potentially be made during the normalisation process to avoid the overflow condition, but reduces the overall range that can be expressed by the combined counter value. This hence reduces the likelihood that renormalisation cannot be performed, but often it will be the case that suitable flexibility in renormalisation can be achieved without full overlap, hence allowing an enhanced counter range to be achieved whilst still providing sufficient renormalisation capabilities.

The earlier-discussed combined counter formed by combining a major counter value and a minor counter value, where the major counter value is formed by the earlier-discussed hybrid counter value, can be utilised in a variety of different situations. However, one particular example scenario where such a counter mechanism may be used is when performing verification of the integrity of data stored in memory. In particular, the apparatus may further comprise memory access circuitry to control access to data stored in a memory and memory security circuitry to verify integrity of data stored in the memory. In response to access to a target data block in the memory, the memory security circuitry may then be arranged to verify integrity of the target data block by comparing a stored authentication code associated with the target data block with a calculated authentication code generated based on the target data block and a target counter which is associated with the target data block. The target counter has a combined counter value generated from a combination of the major counter value and a selected one of the minor counter values. Hence, in such an implementation, the combined counter can be used to form a target counter used when generating authentication codes.

Within such an implementation, the use of the major counter value associated with a plurality of minor counter values can give rise to more efficient memory performance. As one specific example scenario where the use of major counter values and minor counter values of the above form may be beneficial, the memory security circuitry may be arranged to maintain a counter integrity tree comprising a plurality of nodes, each node specifying a plurality of counters associated with respective data blocks of the memory, the plurality of nodes comprising at least one parent node for which at least one of the counters is associated with a data block storing a child node providing further counters of the counter integrity tree, and at least one leaf node for which at least one the counters is associated with a data block storing data other than the counter integrity tree. At least one of the nodes of the counter integrity tree may comprise a split-counter node specifying multiple counters each of which is defined as a combination of the major counter value and one of the minor counter values.

As the minor counter value specified separately per counter is smaller than if all the required number of bits had to be provided entirely separately for each counter (as some of the bits are covered by the shared major counter provided once for a group of counters), this means that the number of minor counter values which can fit within a data block of a given size is greater and so effectively the number of data blocks whose counters can be specified within a single node of the counter integrity tree can be increased. In other words, the arity of the counter integrity tree nodes can be greater (the arity refers to the number of child nodes provided per parent node). Assuming a given size of memory region for which data verification is to be provided by the memory security circuitry, if the arity of the split counter nodes can be increased, the number of levels of the counter integrity tree which would need to be traversed to obtain all the counters for checking the integrity of the data block and the integrity of the counters themselves can be reduced. This means that less memory traffic is generated during traverse of the counter integrity tree and hence there is an improvement in performance by requiring fewer read operations when performing the data integrity operations in respect of the data whose integrity is seeking to be verified by the activities of the memory security circuitry.

Particular examples will now be described with reference to the Figures.

FIG. 1 is a block diagram illustrating circuitry used to provide a hybrid counter value in accordance with one example implementation. The counter circuitry comprises first counter control circuitry 110 and second counter control circuitry 120. The first counter control circuitry 110 has a storage component 125 used to maintain a first counter value, the first counter value being a binary value that indicates a magnitude of the counter value maintained therein. Adder circuitry 130 is provided to enable an adjustment value to be added to the current first counter value in order to generate an updated first counter value for storing back into the storage element 125. The adjustment value may be an arbitrary value smaller than or equal to the maximum value of the first counter.

In contrast to the binary value maintained by the first counter control circuitry 110, the second counter control circuitry 120 is arranged to maintain within a storage element 135 a second counter value that is formed as a bit sequence with N discrete states. There is no absolute magnitude associated with any particular discrete state of the bit sequence, but upon receipt of a trigger the storage element 135 can be arranged to transition the bit sequence stored therein from a current discrete state to a next discrete state. Such a trigger is generated by adjustment circuitry 140 that is responsive to a carry out signal from the adder circuitry 130. Accordingly, when the addition performed by the adder circuitry 130 based on a provided adjustment value causes an overflow within the counter value generated by the adder circuitry, then a carry out signal is asserted to the adjustment circuitry 140, causing a state transition to be triggered in respect of the bit sequence maintained as the second counter value within the storage element 135.

As a result, the circuitry shown in FIG. 1 can provide a hybrid counter value that can be incremented by an arbitrary value smaller than, or equal to, the maximum binary value of the first counter, thereby allowing this hybrid counter mechanism to be used in a variety of implementations where it would not be possible to merely use a counter mechanism that could not provide an indication of magnitude. However, the range of discrete counter values can be extended beyond that available purely from the first counter value, but using significantly less hardware than would be the case had the entire counter been implemented using a traditional binary counter. In particular, whilst the adder circuitry within the first counter control circuitry 110 needs to determine and manage the carry bits generated during the addition operation, the second counter control circuitry 120 requires no such complexity, and instead merely maintains an arbitrary bit sequence whose state is changed in response to a carry out signal asserted from the adder circuitry 130 in the first counter control circuitry 110.

As shown in FIG. 1, the hybrid counter value can be formed merely by concatenating together the first counter value and the second counter value, with the second counter value forming a second portion of the hybrid counter value that is a higher order portion of the hybrid counter value than the first portion formed by the first counter value. It should be noted that the hybrid counter value is not constrained to only be formed by a concatenation of the first counter value and the second counter value. For example, in other implementations one or more additional portions of the hybrid counter value may be formed by additional components. As a specific example, the hybrid counter value may include another portion providing a number of bits of less significance than the bits provided by the first counter value 125.

Figure 2:
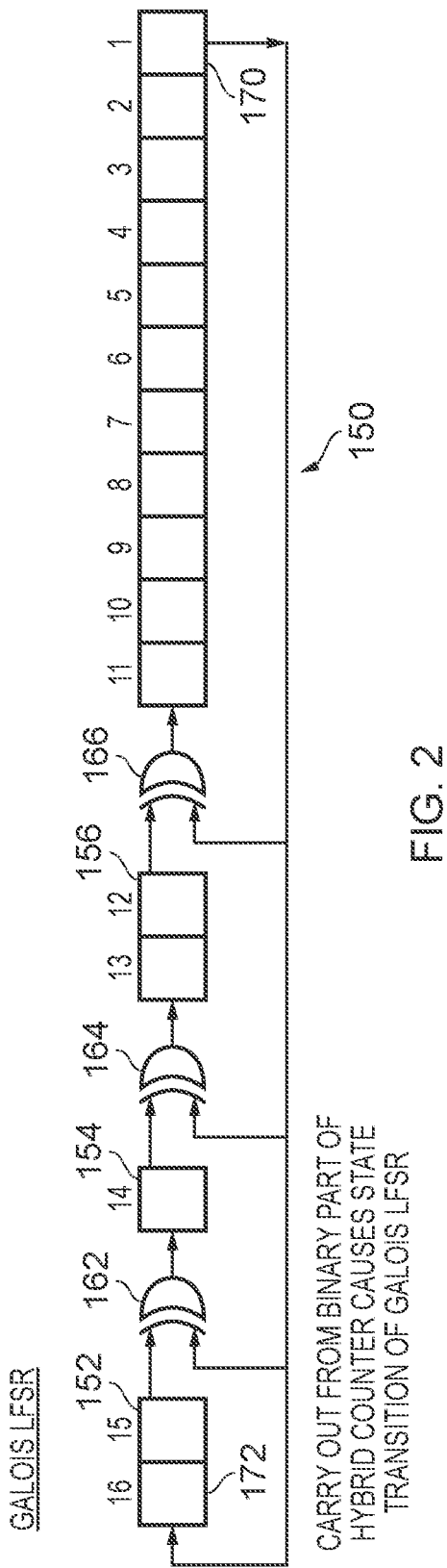
FIG. 2 schematically illustrates a Galois linear feedback shift register that may be used to maintain the second counter value of the circuitry of FIG. 1 in one example implementation.

The second counter value 135 can take a variety of forms, but in one example implementation is formed as a Galois counter. An example of such a Galois counter is shown in FIG. 2, for the example of a Galois linear feedback shift register (LFSR). In this specific example, a sixteen bit LFSR is provided, and the bit positions 152, 154 and 156 are taps. When the LFSR is triggered to increment its state, the value in the bit position 1 170 is used as an output bit, and forms the next input bit into the bit position 172. Bits that are not taps are shifted one position to the right unchanged. However, the taps on the other hand are XORed with the output bit from the bit position 170 before they are stored in the next bit position, using the XOR components 162, 164, 166 respectively. By appropriate selection of the initial values of the tap bits, it can be ensured that the Galois LFSR cycles through all possible values of the bit sequence represented within the LFSR (other than the all zero state) before returning to the initial state.

Whilst a hybrid counter value generated using the apparatus of FIG. 1 may be used in a wide variety of situations, to provide a cheap alternative to an equivalent binary counter having the same number of discrete values, it can be particularly beneficially employed within systems that represent a series of counter values by the combination of a common major counter value and a number of different minor counter values. In particular, each combined counter value can be formed by combining the common major counter value with a selected one of the minor counter values. In such an implementation, the major counter value can be formed by the above-discussed hybrid counter value. Such an apparatus for generating a combined counter value is shown in FIG. 3.

As shown, the major counter control circuitry 180 is used to maintain a hybrid counter value formed of the Galois part 186 and the binary part 184. This hybrid counter value can be provided to combined counter generation circuitry 192 that is used to combine the hybrid counter value with a selected minor counter value selected by the minor counter selector 190.

Figure 3:
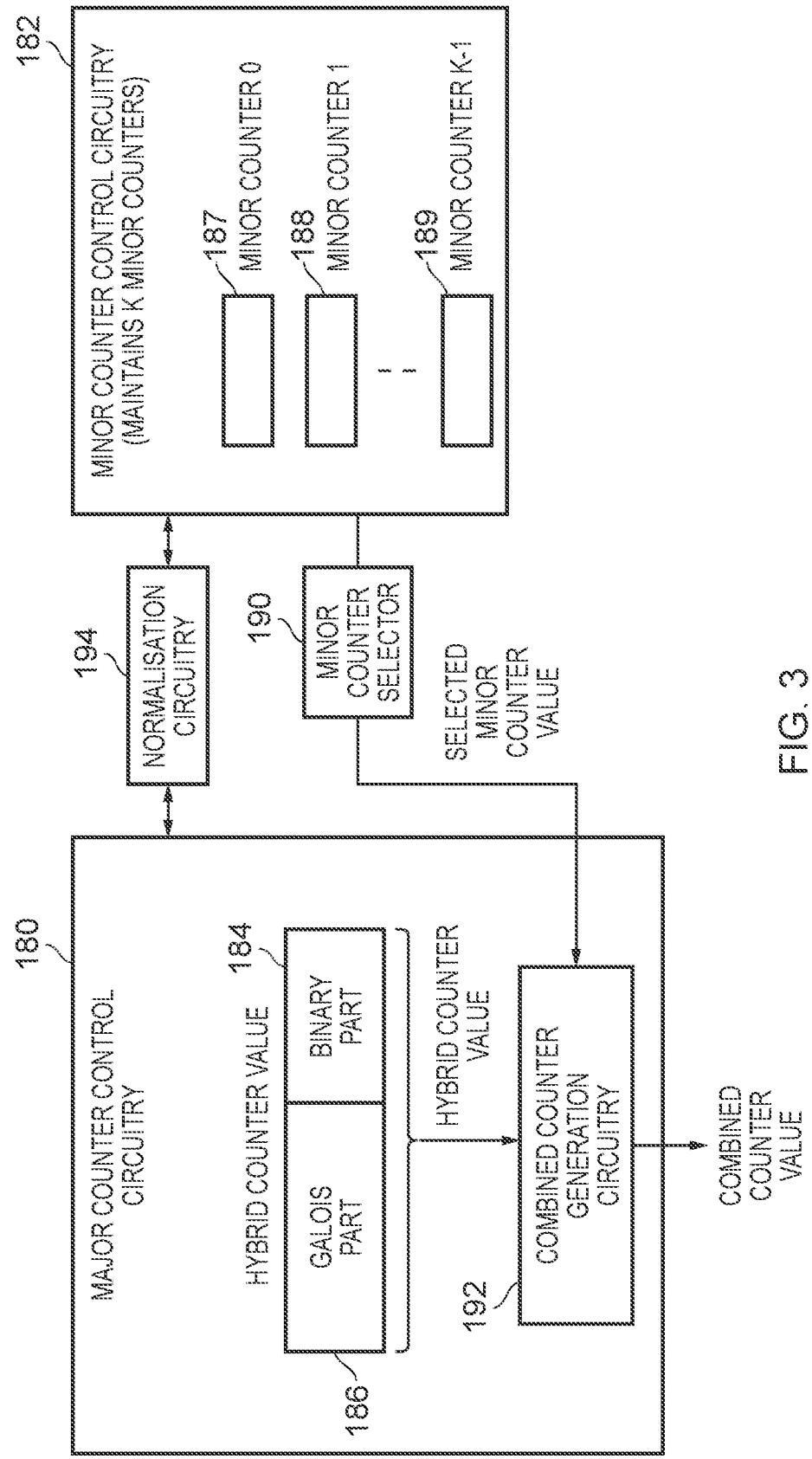
FIG. 3 illustrates circuitry used to produce a combined counter value in accordance with one example implementation.

As shown in FIG. 3, minor counter control circuitry 182 can be used to maintain a plurality K of minor counters 187, 188, 189. Whenever a specific one of those minor counters is selected by the minor counter selector 190, the combined counter generation circuitry 192 can generate a combined counter value formed by combining the hybrid counter value with that selected minor counter.

Typically, it may have been considered necessary to implement the major counter value using counter control circuitry that maintained the entire major counter value as a binary value that indicated a magnitude of that major counter value. However, in accordance with the techniques described herein that is not necessary, and accordingly the major counter value can be implemented with significantly reduced hardware cost. In particular, the size of the first counter value (i.e. the binary part) of the hybrid counter value can be chosen taking into account the size of the minor counter values, and hence for example the range of values that may need to be added to the hybrid counter value when generating the combined counter value. However, the remaining more significant bits of the major counter value can be expressed using a Galois counter, since an absolute magnitude is not required in respect of those more significant bits of the major counter value. Instead, the carry out signal from the first counter value, when set, can be used to transition the second counter value from a current state to a next state, thereby ensuring that a unique combined counter value is generated in situations where the addition of the selected minor counter value to the major counter value results in a carry out from the first counter value.

Figure 4A:
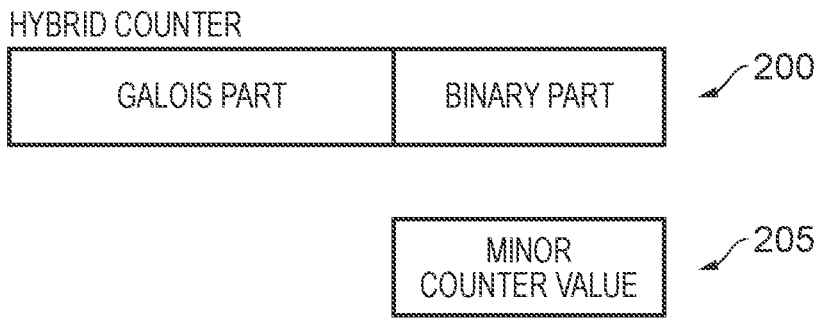
FIGS. 4A to 4C schematically illustrate how the hybrid counter and minor counter components of the combined counter value may be overlapped in accordance with different example implementations.
Figure 4B:
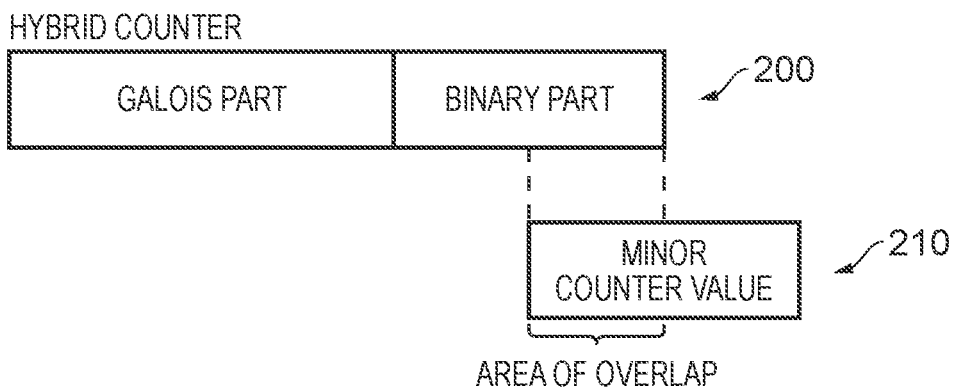
Figure 4C:
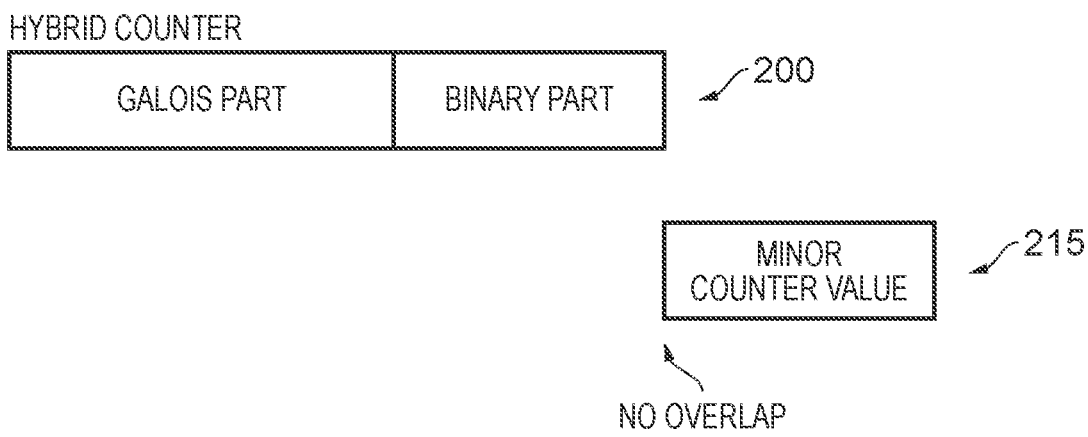

FIGS. 4A to 4C schematically illustrate how the hybrid counter value and the minor counter values may be combined by the combined counter generation circuitry 192. In the example shown in FIG. 4A, the minor counter value 205 is entirely overlapped with the binary part 200 of the hybrid counter. However, as shown in FIG. 4B, an enhanced overall counter range can be achieved by only providing a partial overlap between the minor counter value 210 and the binary part 200. As shown in FIG. 4C, the largest overall range of the combined counter value could be achieved by arranging for the hybrid counter and the minor counter value to be non-overlapping. However, whilst this maximises the overall numerical range, an issue can arise in situations where a minor counter value overflows. In particular, when there is no overlap between the hybrid counter and the minor counter value, it is not possible to take any renormalisation steps in order to avoid the overflow of the minor counter value. However, when there is at least partial overlap between the hybrid counter and the minor counter value, then it is possible to perform a renormalisation process whereby each minor counter value is decremented by a chosen amount in order to remove the overflow problem, and that chosen amount is then added to the binary part of the hybrid counter. The overall result is that the combined counter value generated from each minor counter remains the same, but overflow of any minor counter is avoided. It will be appreciated that the arrangement of FIG. 4A maximises the adjustment that can potentially be made during such a renormalisation process to avoid overflow of a minor counter value. However, in practice it is often found that suitable flexibility in renormalisation can be achieved without full overlap, and accordingly the approach shown in FIG. 4B often allows sufficient renormalisation capabilities whilst enhancing the overall counter range relative to the approach of FIG. 4A.

Figure 5:
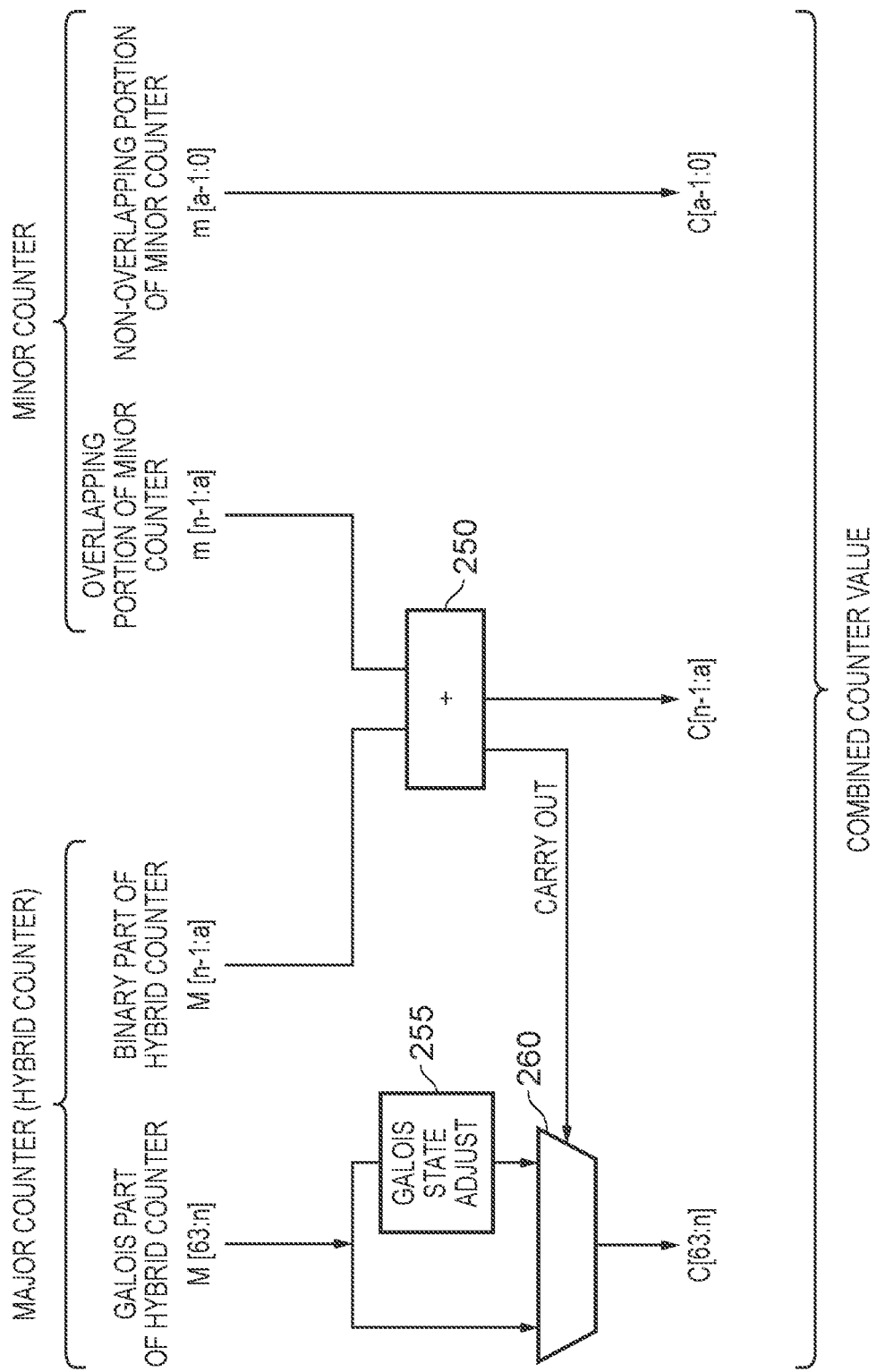
FIG. 5 illustrates the combined counter generation circuitry of FIG. 3 in accordance with one example implementation.

FIG. 5 is a diagram illustrating in more detail the combined counter generation circuitry 192 of FIG. 3, in accordance with one example implementation. As shown in FIG. 5, it is assumed that there is partial overlap between the minor counter and the major counter, but there are at least a number of least significant bits of the minor counter that do not overlap, and these pass unchanged to form the least significant bits of the combined counter value. With regard to the overlapping portion of the minor counter, it is assumed in the figure that this is zero extended such that the adder receives the same number of bits from both the overlapping portion of the minor counter and the binary part of the hybrid counter. The binary part of the hybrid counter is added to the overlapping portion of the minor counter (zero extended as discussed above if necessary) by the adder 250, in order to generate bits n−1 to a of the combined counter value. A carry out signal is also used to control operation of the multiplexer 260. One input of the multiplexer receives the current Galois part of the hybrid counter, and the other input receives an adjusted version of the Galois counter, this representing the next discrete state in the N discrete states available for the Galois counter. If the carry out signal is not asserted, then the current Galois value is merely output to form the upper bits of the combined counter value, but if the carry out bit is set, then the output from the Galois state adjust circuitry 255 is instead output as the most significant bits of the combined counter. In that event, the storage element maintaining the Galois counter will also be updated to identify the currently used state of the Galois counter when generating the combined counter value.

Figure 6:
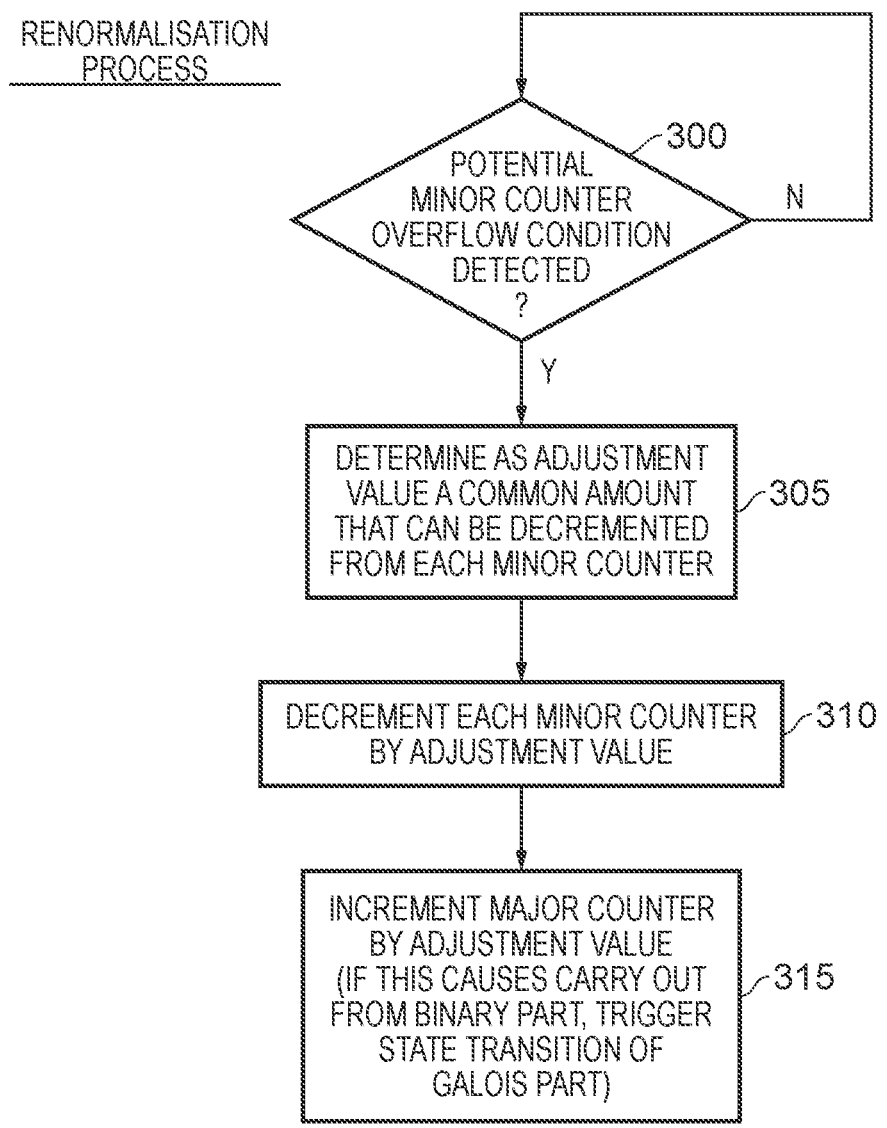
FIG. 6 is a flow diagram illustrating a normalisation process that may be implemented within the combined counter circuitry of FIG. 3 in accordance with one example implementation.

FIG. 6 is a flow diagram illustrating a renormalisation process that may be performed using the normalisation circuitry 194 of FIG. 3. At step 300, the normalisation circuitry determines where there is a potential minor counter overflow condition. This can be detected in a variety of ways. For example, when any one of the minor counter values stores a value that is within a predetermined range of the maximum possible storable value within a minor counter, then the overflow condition can be detected. Thereafter, at step 305 an adjustment value is determined, this being a common amount that can be decremented from each minor counter. During this process, there may be a default adjustment value that will be used taking into account the condition used to assess the overflow condition. For example, if the overflow condition occurs whenever one of the minor counter values reaches a value that is 4 less than the maximum value, then the default adjustment value may be a value of 8, but in that example, in order for the default adjustment value to be used it needs to be ensured that all of the minor counter values currently store at least a value of 8 so that the adjustment value can be decremented from each minor counter value without loss of information. Otherwise, an adjustment value needs to be chosen that is less than, or equal to, the minimum value maintained by any one of the minor counters.

At step 310, the portion of each minor counter that overlaps with the major counter is decremented by the chosen adjustment value (considering the example of FIG. 5, this can be achieved by left shifting the adjustment value by "a" before subtracting it from the minor counter value), and at step 315 the major counter is incremented by the same adjustment value. If such an increment to the major counter value causes a carry out from the binary part, then this will trigger a state transition of the Galois part.

The above discussed combined counter can be used in a variety of situations. However, in one particular example scenario such a counter mechanism is used when performing verification of the integrity of data stored in memory.

In such a system memory access circuitry may be provided for controlling access to data stored in memory, and memory security circuitry may be provided for verifying integrity of data stored in a protected memory region of the memory. For example, the integrity verification may be used to seek to detect tampering with the data stored in the protected memory region by an attacker. In one example implementation the memory could be an off-chip memory on a separate integrated circuit from the integrated circuit comprising the memory access circuitry.

The integrity verification may depend on a comparison between the stored data and integrity metadata maintained by the memory security circuitry. For example, when writing data to the protected memory region, the memory security circuitry may generate integrity metadata based on properties of data stored to the protected memory region, and when reading data from the protected memory region, the memory security circuitry may use the integrity metadata to check whether the data has changed since it was written. However, such integrity metadata can require a significant amount of storage space to provide all the metadata for protecting the entire address range of the protected memory region. Often the capacity to hold data in a storage unit which is not vulnerable to an attacker may be limited, so in practice it may be required to store at least part of the integrity metadata to the protected memory region itself. As this makes the metadata vulnerable to an attack, the integrity metadata may itself need to be subjected to integrity verification when it is read (in a similar way to the actual data of interest), typically using further metadata which may also be stored in the protected region. Hence, for each read of "real" data in the protected memory region, this may trigger multiple reads of integrity metadata in addition to the real data of interest, and corresponding comparisons to check whether the integrity metadata is valid, and so as the size of the protected memory region increases, it can become increasingly challenging to limit the performance impact of the integrity verification on the overall system performance.

In the techniques discussed below, the memory security circuitry may maintain a counter integrity tree which comprises a number of nodes. Each node specifies multiple counters which are associated with respective data blocks of the protected memory region. The nodes of the counter integrity tree include at least one parent node for which at least one of the counters specified by that parent node is associated with a data block which stores a child node of the counter integrity tree which provides further counters for further data blocks. Also, the nodes include at least one leaf node for which at least one of the counters is associated with a data block that stores data other than the counter integrity tree.

Each counter in the tree is used for generating an authentication code for checking the authenticity of a corresponding data block. Hence, in response to access to a target data block of the protected memory region, the memory security circuitry may verify the integrity of the target data block by comparing a stored authentication code associated with the target data block with a calculated authentication code which is generated based on the target data block and a target counter of the counter integrity tree which is associated with the target data block. Note that the target data block could be the data block which stores the "real" data of interest, or could be a data block which stores one of the nodes of the counter integrity tree itself, which may be accessed as part of the verification process for checking the integrity of some other "real" data block.

The use of an integrity tree helps to guard against replay attacks, which are a form of attack in which an attacker captures a current data value and its valid authentication code at one time (e.g. by reading the memory itself or by monitoring the interface between the memory and the source of the data), and later after that data value is no longer current, attempts to substitute the out-of-date data block and its associated valid authentication code for the correct values stored in memory, which could lead to incorrect behaviour in the apparatus. By providing an integrity tree in which the data from one node is protected by an authentication code calculated based on another node, replay of stale data can be detected from the inconsistency between the old pair of data and authentication code for one node and the calculated authentication code and counter from a parent node. One way of implementing an integrity tree is as a counter integrity tree, which is a type of integrity tree in which the tree is built up of counters such that a parent node provides the counters used for generating the authentication codes for each of its child nodes. However, to avoid frequent overflows of the counters, the counters may need to be provided with a certain number of bits. This can limit the efficiency with which the counter integrity tree can be implemented, as it limits how many counters can be provided per tree node.

To alleviate this problem, at least one of the nodes of the counter integrity tree can be arranged as a split-counter node, which specifies at least two counters each defined as a combination of a major count value which is shared between the at least two counters and a respective minor count value specified separately for each of the at least two counters. Hence, the major count value specifies a common portion shared between each of the two or more counters corresponding to at least two of the data blocks covered by the split-counter node, and the respective minor count values each specify the portion which differs from counter to counter.

The use of such split-counter nodes in the counter integrity tree enables more efficient memory performance. As the minor count value specified separately per counter is smaller than if all the required number of bits had to be provided entirely separately for each counter (as some of the bits are covered by the shared major counter provided once for a group of counters), this means that the number of minor count values which can fit within a data block of a given size is greater and so effectively the number of data blocks whose counters can be specified within a single node of the counter integrity tree can be increased. In other words, the arity of the counter integrity tree nodes can be greater (the arity refers to the number of child nodes provided per parent node). Assuming a given size of protected memory region, if the arity of the split-counter nodes can be increased, the number of levels of the counter integrity tree which would need to be traversed to obtain all the counters for checking the integrity of the data block and the integrity of the counters themselves can be reduced. This means that less memory traffic is generated during traverse of the counter integrity tree and hence there is an improvement in performance by requiring fewer read operations for each access to "real" data in the protected memory region.

Figure 7:
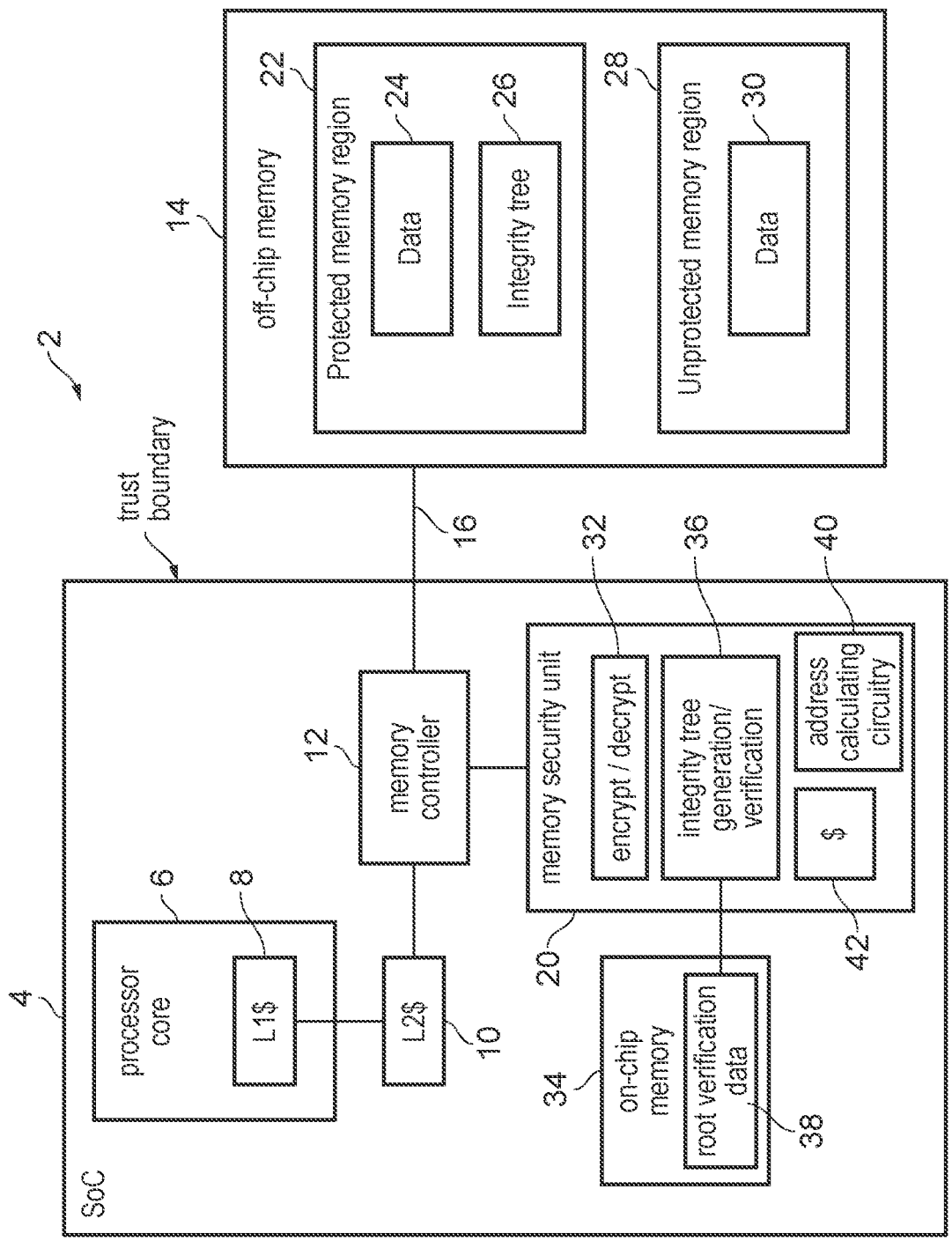
FIG. 7 schematically illustrates an example of an apparatus having memory security circuitry for verifying integrity of data stored in a protected memory region of a memory.

FIG. 7 schematically illustrates an example of a data processing system 2, which comprises an integrated circuit or system on chip 4 which includes at least one processor core 6 for executing program instructions to carry out data processing operations. While FIG. 7 only shows one processor core in some cases the system on-chip 4 may comprise multiple processors. Each processor core or processor core cluster may have a cache 8 (or multiple levels of cache 8, 10). A memory controller 12 acts as memory access circuitry for controlling access to an off-chip memory 14 which is on a separate integrated circuit from the system on-chip 4. While accesses to data on-chip may be difficult to tamper with by an attacker, the edge of the system on-chip may act as a trust boundary and any data passing beyond that boundary may be vulnerable to attack by intercepting data on the physical channel 16 between the memory controller 12 and the off-chip memory 14, or by reading or modifying the data while it is stored in the off-chip memory 14. While FIG. 7 shows an example where the trust boundary corresponds to the edge of the system on-chip, in other cases there could be trust boundaries within a system on-chip which could expose data beyond the trust boundary to potential attacks.

The system on-chip 4 may include a memory security unit 20 provided for protecting data stored to a protected memory region 22 of the off-chip memory 14 from a malicious adversary who has physical access to the system and the ability to observe and/or replay the data or code being exchanged between the microprocessor and the off-chip system memory 14. The protected memory region 22 includes the data 24 to be protected as well as integrity tree metadata 26 used in the verification of the data 24. An unprotected memory region 28 is also provided in the off-chip memory 14, and data 30 stored in the unprotected region is not protected by the memory security unit 20 and so is free to be accessed and modified by an attacker. In some implementations, the mapping of addresses to the protected and unprotected memory regions 22, 28 may be fixed by the hardware, so that it is not possible for an operating system or other software executed by the processor core 6 to vary which addresses are mapped to the protected memory region 22 or unprotected memory region 28. Alternatively, if the operating system controlling the address mapping can be trusted, the address mapping controlling which addresses are mapped to the protected region or the unprotected region may be varied by the processor under control of software, and so the protected and unprotected regions need not always map to the same physical locations in the off-chip memory 14. In some implementations, there may not be any unprotected memory region 28 provided in the off-chip memory 14—in this case the entire off-chip memory could be considered the protected memory region 22.

The memory security unit 20 includes encryption/decryption circuitry 32 for encrypting data being written to the off-chip memory 14 and decrypting data read back from the off-chip memory. This provides privacy by preventing a malicious observer from seeing in the clear the data being read from or stored onto the off-chip memory 14. Encryption keys used by the encryption and decryption may be stored within an on-chip memory (e.g. SRAM) 34 on the system on-chip or within the memory security unit 20 itself. Any known technique may be used for the encryption and decryption, and any known approach for protecting the encryption keys can be used.

The memory security unit 20 also includes integrity tree generation and verification circuitry 36, referred to in general as verification circuitry 36 below. The verification circuitry 36 is responsible for maintaining the integrity tree 26 in the protected memory region. The integrity tree may provide a number of pieces of information for verifying whether data currently stored in the protected region 22 is still the same as when it was written to that region. The checking of data integrity can for example be achieved using message authentication codes (MACs) which may be generated from the stored data using one-way cryptographic functions such as AES-GCM GCM or SHA-256, which use functions which make it computationally infeasible for an attacker to guess the authentication code associated with a particular data value by brute force when a secret key used to generate the authentication code is unknown. The authentication codes may be stored alongside the data 24 in the protected memory region 22 or in a separate data structure. The stored MAC for a data value is checked against a calculated MAC derived from the stored data using the same one-way function used to generate the stored MAC, and if a mismatch is detected between the stored MAC and calculated MAC then this may indicate that the data has been tampered with.

However, providing MACs alone may not be sufficient to prevent all attacks. Another type of attack may be a replay attack where a malicious person with physical access to the system stores a legitimate combination of the encrypted data and the MAC which was observed previously on the bus and then replays these onto the bus later with an intent to corrupt data at a given memory location with stale values so as to compromise the operation of the system. Such replay attacks can be prevented using the integrity tree 26, which may provide a tree structure of nodes where each leaf node of the tree provides integrity data for verifying that one of the blocks of data 24 in the protected memory region 22 is valid and a parent node of a leaf node provides further integrity data for checking that the leaf node itself is valid. Parent nodes may themselves be checked using further parent nodes of the tree, and this continues as the tree is traversed up to the root of the tree which may then provide the ultimate source of verification. Root verification data 38 stored in the on-chip memory 34 may be used to verify that the root of the tree is authentic, either by storing the root node of the tree itself on on-chip, or by storing other information which enables the root node stored in the protected memory region to be authenticated.

The memory security unit 20 may have address calculating circuitry 40 for calculating the addresses at which the nodes of the integrity tree 26 required for checking particular data blocks are located in the protected memory region 22. Optionally, the memory security unit 20 may also have a cache 42 for caching recently used nodes of the integrity tree for faster access than if they have to be read again from the off-chip memory 14. Alternatively, the memory security unit 20 could have access to one of the caches 10 which may also be used by the processor core 6 and so caching of data from the integrity tree 26 within the shared cache 10 could also help to speed up operation of the memory security unit 20.

Figure 8:
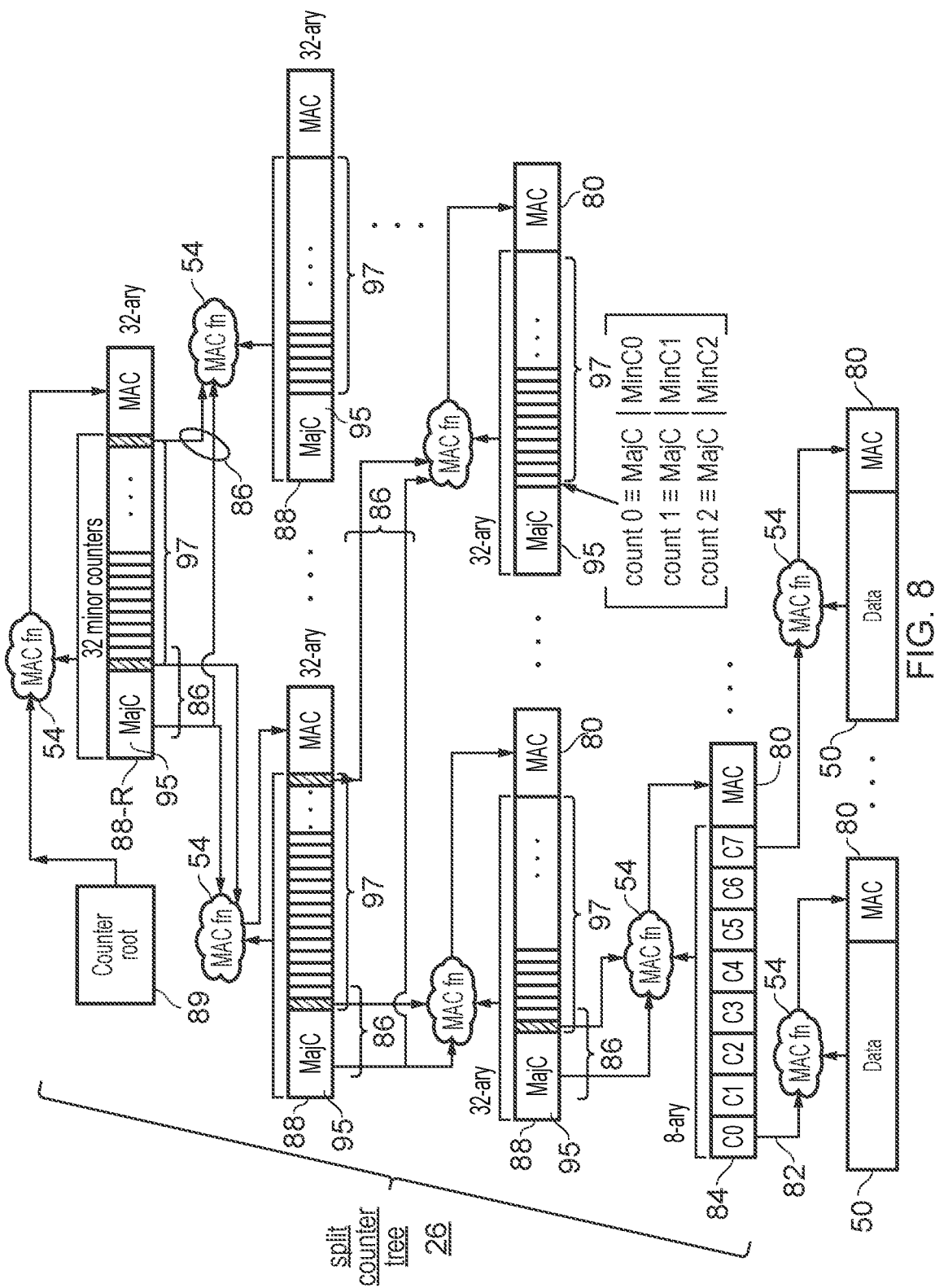
FIG. 8 shows an example of a counter integrity tree including split counter nodes where counters are specified as the combination of a major count value shared between counters and respective minor count values specified separately for each counter.

There are a number of ways in which the integrity tree can be implemented, but in one example implementation a split-counter integrity tree 26 can be used by the memory security unit 20, as shown in FIG. 8. The counter tree has an arrangement of leaf nodes and non-leaf nodes 84, 88, with each parent (non-leaf) node 88 providing the counters for computing the MACs 80 for each of its child nodes and the leaf nodes 84 providing the counters 82 for computing the MACs for other non-integrity tree related data blocks 50. In FIG. 8, at least some of the nodes of the tree use a split-counter approach, in which the counters in that node of the tree are represented in split-form using a major count value 95 and a number of minor count values 97. Each of the minor count values 97 corresponds to one of the data blocks covered by that node of the tree. The actual counter for a given data block is defined by the combination of the major count value 95 (which is shared between all of the blocks covered by that node) and the specific minor count value 97 specified for that data block. For example, the counter for block 0 could correspond to the major count value concatenated with the specific minor count value selected for block 0; the counter for block 1 can correspond to the shared major count value concatenated with the specific minor count value selected for block 1; and so on. Hence, when the MAC 80 is calculated for a given block of data, the MAC function 54 is applied to the contents of the data block together with both the shared major counter 95 from the parent node and one of the minor counters 97 selected for the particular data block. Each minor counter 97 is incremented on each update to the corresponding data block. The shared major counter 95 is incremented when any of the corresponding set of minor counters 97 overflows.

In accordance with one implementation, each major counter is formed as a hybrid counter value of the form discussed earlier, hence comprising a binary first portion and a Galois second portion.

By using this split-counter approach, the overall size of counter provided for each data block can still be relatively large, while still having separate counters for each data block, to make it harder for attackers to guess the counter value applied to a given data block. For example, a 512-bit cache line using a 64-bit MAC could be provided with a 64-bit major counter and 32 12-bit minor counters, effectively providing a 76-bit counter for each data block. Hence, the chance of a counter overflow requiring re-encryption of the entire protected memory region can be reduced by providing a total number of bits of the major counter and one minor counter that is sufficiently large.

However, as the number of child nodes which can be covered by one parent node is dependent on the number of minor counters, and the minor counters in the approach shown in FIG. 8 are smaller than if equivalent monolithic counters were provided, this means that the arity of the tree can be greatly increased so as to permit, for any given size of cache line, a greater number of child nodes per parent node. In the example of FIG. 8, the arity is 32 for the split-counter nodes of the tree. This means that the fan out of the tree is much greater and so fewer levels are required in order to cover a given amount of memory. As shown with the leaf node 84 of FIG. 8, it is not essential for all the nodes of the tree to use the split-counter approach, for example some could still use a monolithic counter approach and so may have a different arity, e.g. eight for the example of FIG. 8. This may be useful if the overall size of the protected memory region does not map to a number of blocks corresponding to an exact power of the arity used in the split counter nodes, in which case some nodes of lower arity may be required.

The hybrid counter mechanism described herein provides a particularly efficient mechanism for providing a counter that can be incremented by various arbitrary values. A first portion of the hybrid counter maintains a binary value, hence enabling the hybrid counter to be adjusted by an arbitrary value smaller than, or equal to, the maximum binary value of that first portion. However, a second, more significant, portion of the hybrid counter is instead implemented using a bit sequence with N discrete states, where the individual discrete states do not indicate a magnitude. Whereas the circuitry provided in association with the first portion of the hybrid counter needs to determine and manage carry bits that may be generated during the addition of an arbitrary value, such complexity is not required in association with the second portion of the hybrid counter, and the second portion can merely be arranged to be transitioned from a current discrete state to a next discrete state as and when required, in particular if a carry out occurs during addition of an arbitrary value to the first portion. Hence, through use of the hybrid counter mechanism a desired range of discrete counter values can be achieved using significantly less hardware than would be the case had the entire counter been implemented as a binary counter.

As discussed above, such a hybrid counter can be used in a variety of situations, but in one particular example implementation is used in combination with a series of minor counter values to enable generation of a combined counter value from a combination of the hybrid counter value and a selected one of the minor counter values.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   first counter control circuitry to maintain a first counter value representing a first portion of a hybrid counter value;
   second counter control circuitry to maintain a second counter value representing a second portion of the hybrid counter value, wherein the second portion is a higher order portion of the hybrid counter value than the first portion;
   wherein:
   the first counter control circuitry is arranged to maintain the first counter value as a binary value that indicates a magnitude of the first counter value, the first counter control circuitry comprising adder circuitry that is responsive to an adjustment value to update the first counter value by performing an addition operation to add the adjustment value to a current binary value of the first counter value and to generate a carry out signal which is set when a carry out is generated by the addition operation; and
   the second counter control circuitry is arranged to maintain the second counter value as a bit sequence having N discrete states, and is responsive to the carry out signal being set to transition the second counter value from a current discrete state to a new discrete state.

2. An apparatus as claimed in claim 1, wherein:
   the second counter control circuitry is arranged to operate as a Galois counter to maintain the second counter value.

3. An apparatus as claimed in claim 2, wherein the second counter control circuitry employs a linear feedback shift register to maintain the second counter value.

4. An apparatus as claimed in claim 1, wherein the hybrid counter value forms a major counter value, and the apparatus further comprises:
   minor counter control circuitry to maintain a plurality of minor counter values, wherein each minor counter value is a binary value that indicates a magnitude of that minor counter value, and each minor counter value is used in combination with the major counter value to form a corresponding combined counter value; and
   combined counter generation circuitry to generate a combined counter value by combining the major counter value and a selected one of the minor counter values.

5. An apparatus as claimed in claim 4, wherein:
   at least one or more most significant bits of each minor counter value form an overlap portion that overlaps with a corresponding number of least significant bits of the first counter value;
   the apparatus further comprising normalisation circuitry responsive to a potential overflow condition being detected for a given minor counter value, to determine the adjustment value, to cause the adjustment value to be added to the first counter value, and to cause the overlap portion of each minor counter value to be decremented by the adjustment value, such that the potential overflow condition is addressed without changing the combined counter value generated from any minor counter value.

6. An apparatus as claimed in claim 5, wherein the potential overflow condition is detected when addition of a specified value to the given minor counter value would cause the given minor counter value to overflow, and the adjustment value is chosen such that the specified value can be added to the given minor counter value as decremented by the adjustment value without the overflow condition arising.

7. An apparatus as claimed in claim 5, wherein all bits of each minor counter value overlap with corresponding bits of the first counter value.

8. An apparatus as claimed in claim 4, further comprising:
   memory access circuitry to control access to data stored in a memory; and
   memory security circuitry to verify integrity of the data stored in the memory;
   wherein:
   in response to access to a target data block in the memory, the memory security circuitry is arranged to verify integrity of the target data block by comparing a stored authentication code associated with the target data block with a calculated authentication code generated based on the target data block and a target counter which is associated with the target data block;

wherein the target counter has a combined counter value generated from a combination of the major counter value and a selected one of the minor counter values.

9. An apparatus as claimed in claim 8, wherein:

the memory security circuitry is arranged to maintain a counter integrity tree comprising a plurality of nodes, each node specifying a plurality of counters associated with respective data blocks of the memory, the plurality of nodes comprising at least one parent node for which at least one of the counters is associated with a data block storing data associated with a child node associated with further counters of the counter integrity tree, and at least one leaf node for which at least one the counters is associated with a data block storing data other than the counter integrity tree; and at least one of the nodes of the counter integrity tree comprises a split-counter node specifying multiple counters, each of said multiple counters being a combination of the major counter value and one of the minor counter values.

10. A method of maintaining a hybrid counter value, comprising:

storing a first counter value representing a first portion of a hybrid counter value;

storing a second counter value representing a second portion of the hybrid counter value, wherein the second portion is a higher order portion of the hybrid counter value than the first portion;

maintaining the first counter value as a binary value that indicates a magnitude of the first counter value;

in response to an adjustment value, employing adder circuitry to update the first counter value by performing an addition operation to add the adjustment value to a current binary value of the first counter value and to generate a carry out signal which is set when a carry out is generated by the addition operation;

maintaining the second counter value as a bit sequence having N discrete states; and in response to the carry out signal being set, transitioning the second counter value from a current discrete state to a new discrete state.

11. An apparatus comprising:

first counter control means for maintaining a first counter value representing a first portion of a hybrid counter value;

second counter control means for maintaining a second counter value representing a second portion of the hybrid counter value, wherein the second portion is a higher order portion of the hybrid counter value than the first portion;

wherein:

the first counter control means is arranged for maintaining the first counter value as a binary value that indicates a magnitude of the first counter value, the first counter control means comprising adder means responsive to an adjustment value for updating the first counter value by performing an addition operation to add the adjustment value to a current binary value of the first counter value and for generating a carry out signal which is set when a carry out is generated by the addition operation; and the second counter control means is arranged for maintaining the second counter value as a bit sequence having N discrete states and, responsive to the carry out signal being set, for transitioning the second counter value from a current discrete state to a new discrete state.

* * * * *